Jan. 12, 1937.   O. B. JACOBSEN   2,067,710
SEPARATOR
Filed June 4, 1935

Olaf Berg Jacobsen
Inventor

Patented Jan. 12, 1937

2,067,710

UNITED STATES PATENT OFFICE 2,067,710

SEPARATOR

Olaf Berg Jacobsen, Wembley, England, assignor to himself and The Buell Combustion Company Limited, London, England, a British limited-liability company, jointly Application June 4, 1935, Serial No. 24,840
In Great Britain June 21, 1934

1 Claim. (Cl. 183—83)

The invention relates to dust separators or collectors of the type in which dust laden air or gas is separated from the solid matter suspended therein, by the action of centrifugal force produced by the rapid whirling or rotating movement of the air or gas inside a cylindrical or volute casing; the dust thus thrown out against the separator casing being collected and allowed to gravitate towards the dust outlet opening at the bottom of the collector, which may be of an inverted truncated conical formation or consist of alternate tapered truncated cones and vertical cylindrical portions of gradually diminishing transverse cross section, whilst the air or gas that has been rendered free of dust passes through an outlet situated at the upper end of the apparatus.

According to this invention the above mentioned results are obtained in a more effective manner by the provision of shields, linings, or catch plates of circular cross section concentrically placed inside the collector casing below and above each junction between the cylindrical and conical formations of the casing in such a manner that annular narrow spaces which are open at each end are formed between the shields, linings, or catch plates on the one side and the collector casing on the other side.

These shields, linings, or catch plates are of cylindrical and truncated cone shaped formation, according to the corresponding shape of the collector casing, and are supported upon the casing by distance pieces and bolts or any other suitable means in such a way that the shields linings or catch plates are held in a position concentric with the collector casing, and offer a minimum of obstruction to the passage of the dust through the annular spaces already referred to.

These annular spaces are made of different width according to the diameter of the apparatus and also according to the dust density in the air or gas to be treated, whilst the length of each shield lining or catch plate is dependent upon and proportional to its diameter and the length of the corresponding portion of the outside collector casing.

In order that the invention may be the better understood I will now proceed to describe the same in relation to the accompanying drawing, reference being had to the letters and figures marked thereon. Like letters refer to like parts in the various figures in which:—

Figure 1:
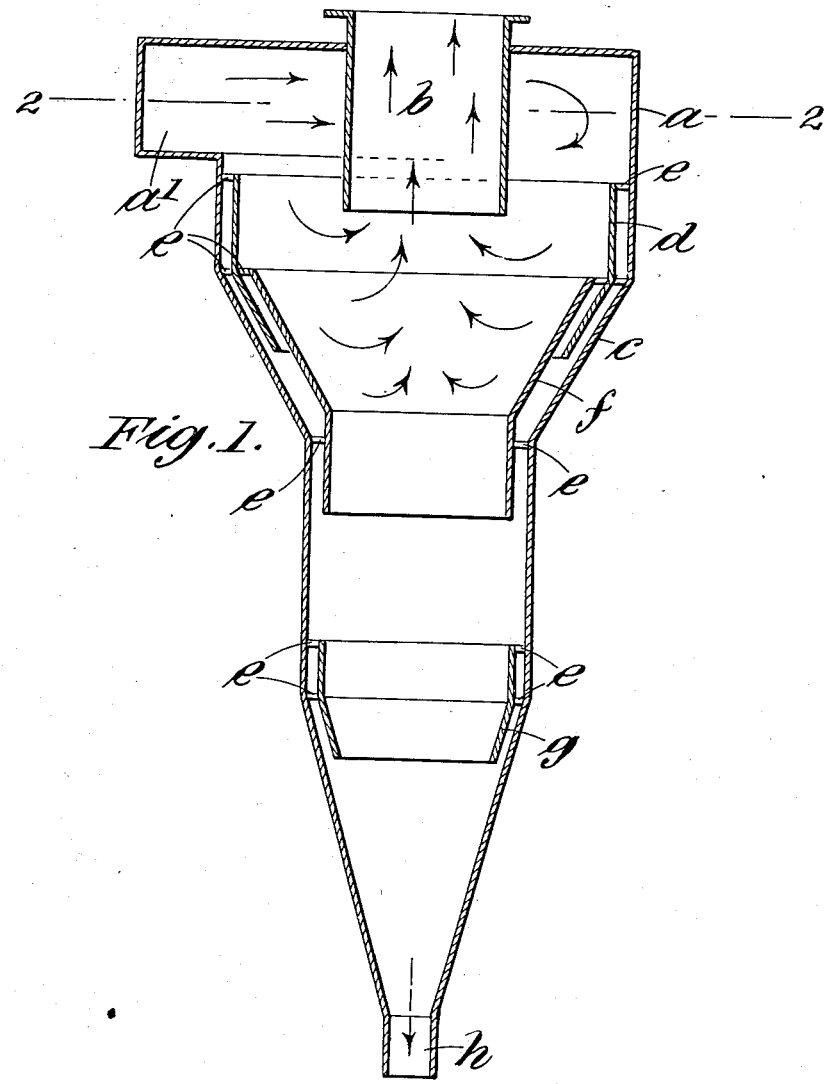
Fig. 1 is a vertical section of a separator constructed in accordance with the invention.
Figure 2:
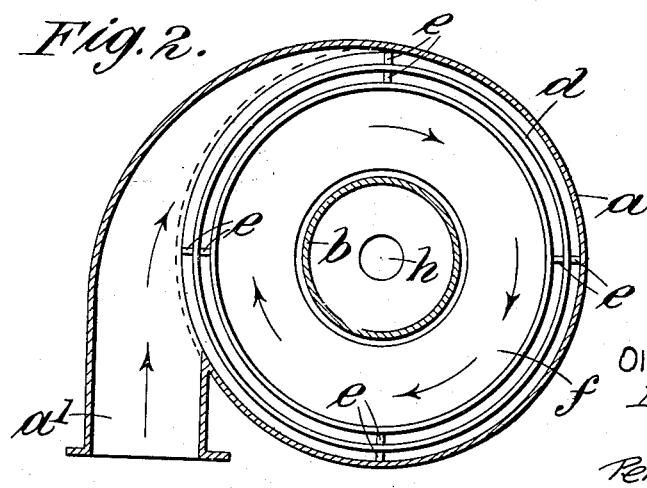
Fig. 2 is a sectional plan of the same taken on line 2—2 of Figure 1.

The upper part $a$ of the separator is of volute formation having a tangentially disposed inlet branch $a^1$ through which the dust laden air or gas is forced for treatment. The upper part $a$ carries the outlet pipe $b$ through which the air after separation from the dust passes into the atmosphere. The lower end of the part $b$ is attached to a conical part $c$ and below such part another pair of cylindrical and conical parts follow. Within the part $a$ near the position of the tangential inlet a catch plate $d$ is mounted by means of distance pieces $e$ of streamline formation upon the outside casing. Similar catch plates $f$ and $g$ are disposed at the junction of the conical and cylindrical elements arranged in the middle and lower part of the separator which terminates in the discharge outlet $h$ through which the dust caught by the catch plates $d$ $f$ and $g$ falls by gravity into any suitable receptacle.

It has been found in the past in the working of known apparatus of this type that the dust which is concentrated against the inside separator casing is liable to be projected inwards towards the axis of the separator wherever the section changes from cylindrical to conical, or vice versa and such dust is liable to be drawn into the vortex and thereby carried away by the escaping air or gas and thus lost. It has also been found that quantities of dust accumulate in certain parts of the separator, notably at the top, and adjacent to parts where changes in section of the outer casing occur. These disadvantages are entirely overcome by this invention as any dust accumulations are evacuated from such points through the annular space or spaces formed by the shields, and again released into the main separator body at such points where the dust no longer is liable to be disturbed by changes of cross sections or the influence of disturbing eddy currents.

I claim:

In a dust separator of the type in which the action of centrifugal force is impressed on the dust particles by giving the air or gas carrying the said particles a rapid whirling or rotating movement inside a volute casing for delivery into a conical collector casing below, the arrangement of a collector casing the upper part of which is of volute form followed by two or more lower parts of combined cylindrical and conical form, each lower part being of less diameter than the part preceding it and a shield of combined cylindrical and conical form disposed inside the collector casing at each junction between the cylindrical and conical parts of the collector casing so as to follow the contour of the collector casing at a distance therefrom thus leaving an open annular space at each end of each shield and means for holding each shield rigidly in position on the collector casing with a minimum obstructive effect on the matter passing through the annular spaces.

OLAF BERG JACOBSEN.